(12) United States Patent
Stahl et al.

(10) Patent No.: US 10,589,619 B2
(45) Date of Patent: Mar. 17, 2020

(54) ANGLED TORQUE TRANSMISSION SYSTEM AND METHOD

(71) Applicant: Horton, Inc., Roseville, MN (US)

(72) Inventors: Mat Stahl, Maple Grove, MN (US); Michael Bieber, Minneapolis, MN (US); Jacob Andre, Roberts, WI (US); Neal Shawaluk, Lino Lakes, MN (US)

(73) Assignee: HORTON, INC., Roseville, MN (US)

(*) Notice: Subject to any disclaimer, the term of this patent is extended or adjusted under 35 U.S.C. 154(b) by 77 days.

(21) Appl. No.: 15/570,813

(22) PCT Filed: May 13, 2016

(86) PCT No.: PCT/US2016/032391
§ 371 (c)(1),
(2) Date: Oct. 31, 2017

(87) PCT Pub. No.: WO2016/187016
PCT Pub. Date: Nov. 24, 2016

(65) Prior Publication Data
US 2018/0162217 A1    Jun. 14, 2018

Related U.S. Application Data

(60) Provisional application No. 62/163,659, filed on May 19, 2015.

(51) Int. Cl.
*B60K 11/06* (2006.01)
*F02B 67/06* (2006.01)
(Continued)

(52) U.S. Cl.
CPC .............. *B60K 11/06* (2013.01); *B60K 25/02* (2013.01); *F01P 7/042* (2013.01); *F02B 67/06* (2013.01);
(Continued)

(58) Field of Classification Search
CPC .......... B60K 11/06; B60K 6/48; B60K 17/08; B60K 2025/022; B60K 25/02; F02B 39/06; F02B 39/12
See application file for complete search history.

(56) References Cited

U.S. PATENT DOCUMENTS

| 575,637 A | 1/1897 | Dold |
| 918,782 A | 4/1909 | Siffert et al. |
| (Continued) |

FOREIGN PATENT DOCUMENTS

| CN | 2538594 Y | 3/2003 |
| CN | 2752453 Y | 1/2006 |
| (Continued) |

OTHER PUBLICATIONS

International Search Report and Written Opinion of the International Search Authority dated Jan. 8, 2018, issued for corresponding International Application PCT/2016/032391, filed May 13, 2016.
(Continued)

*Primary Examiner* — Long T Tran
(74) *Attorney, Agent, or Firm* — Westman, Champlin & Koehler, P.A.

(57) ABSTRACT

A torque transmission system (20) for transmitting torque from a prime mover (22) along a drivetrain includes a clutch device (28) configured to accept a torque input from the prime mover, an intermediate pulley (32), a belt (30) operatively engaged between the clutch device and the intermediate pulley, an angle gearbox (36) configured to change a spatial orientation of torque transmitted between an input and an output of the angle gearbox, a driveshaft (34) operably engaged between the intermediate pulley and the angle gearbox, and an output device (38) configured to accept a torque output from the angle gearbox. The clutch
(Continued)

device is located upstream from the intermediate pulley and the angle gearbox along the drivetrain.

20 Claims, 4 Drawing Sheets

(51) Int. Cl.
*B60K 25/02* (2006.01)
*F01P 7/04* (2006.01)
*F16H 55/36* (2006.01)

(52) U.S. Cl.
CPC ........ *B60K 2025/022* (2013.01); *F16H 55/36* (2013.01)

(56) References Cited

U.S. PATENT DOCUMENTS

| | | | |
|---|---|---|---|
| 1,411,126 A | 3/1922 | Page | |
| 1,991,575 A | 1/1934 | Reese | |
| 2,230,165 A | 1/1941 | Preston | |
| 3,605,962 A * | 9/1971 | Maynard | B60K 17/28 |
| | | | 477/175 |
| 3,613,645 A | 10/1971 | Froumajou | |
| 3,883,073 A | 5/1975 | Ballu et al. | |
| 4,157,135 A | 6/1979 | Devlin et al. | |
| 4,607,714 A | 8/1986 | Uttenthaler | |
| 4,756,208 A | 7/1988 | Hayashi et al. | |
| 4,773,119 A * | 9/1988 | Duthie | E01H 1/0827 |
| | | | 15/340.1 |
| 5,242,013 A | 9/1993 | Couetoux | |
| 6,027,032 A * | 2/2000 | Aoki | B60H 1/038 |
| | | | 237/12.3 R |
| 6,039,037 A * | 3/2000 | Taomo | B23D 47/12 |
| | | | 125/13.01 |
| 6,588,299 B2 | 7/2003 | Ishimori et al. | |
| 6,732,845 B2 | 5/2004 | Tilly et al. | |
| 7,856,820 B2 | 12/2010 | Ishii et al. | |
| 8,453,815 B2 | 6/2013 | Gebhart | |
| 8,732,947 B2 | 5/2014 | Swanson et al. | |
| 8,887,888 B2 | 11/2014 | Hennessy et al. | |
| 8,931,373 B2 | 1/2015 | Suzuki et al. | |
| 2002/0081917 A1 * | 6/2002 | Roycroft | B60K 17/28 |
| | | | 440/38 |
| 2002/0096133 A1 * | 7/2002 | McGovern | F01P 5/12 |
| | | | 123/41.48 |
| 2011/0207577 A1 * | 8/2011 | Swanson | F16D 27/112 |
| | | | 476/11 |
| 2014/0048962 A1 | 2/2014 | Rollins et al. | |
| 2014/0060219 A1 | 3/2014 | Marotte et al. | |
| 2014/0209427 A1 | 7/2014 | Swanson et al. | |
| 2014/0314546 A1 | 10/2014 | Davis et al. | |

FOREIGN PATENT DOCUMENTS

| | | |
|---|---|---|
| CN | 201265448 Y | 7/2009 |
| CN | 102667213 A | 9/2012 |
| CN | 203090461 U | 7/2013 |
| CN | 103967579 A | 8/2014 |
| DE | 10030607 A1 | 1/2002 |
| DE | 202007001923 U1 | 4/2007 |
| EP | 967104 A2 | 12/1999 |
| EP | 1965095 A1 | 9/2008 |
| GB | 1526542 A | 9/1978 |
| GB | 2098146 A | 11/1982 |
| KR | 10-1204942 B1 | 11/2012 |
| WO | 2003020583 A2 | 3/2003 |
| WO | 2009067048 A1 | 5/2009 |
| WO | 2011062856 A2 | 5/2011 |
| WO | 2014158397 A1 | 10/2014 |

OTHER PUBLICATIONS

Extended European Search Report dated Apr. 24, 2019, in corresponding European patent application No. EP16797012.
Kendrion Linnig Products, "Applications in Many Areas" (2013), 1 page.
Office Action issued in corresponding Chinese application No. 2016800284922, dated Aug. 1, 2019.

* cited by examiner

ANGLED TORQUE TRANSMISSION SYSTEM AND METHOD

BACKGROUND

The present invention relates generally to a torque transmission system and associated method, and more particularly to selectively controllable torque transmission system that provides an output at an angle (e.g., 90°) relative to a torque input, and an associated method.

Fans are used in a variety of vehicular, vocational and industrial settings to provide cooling flows. In some vehicular applications, such as for busses and recreational vehicles (RVs), vehicle configurations may impose significant constraints as to where a fan can be positioned in relation to an engine the powers the fan. For instance, such vehicle configurations may include an engine that is located at a rear or side position relative to the vehicle chassis, where engine compartment space does not permit both a fan and fan clutch to be mounted directly to the engine in a coaxial arrangement. Yet a fan for generating cooling flows may be crucial because limited ram air is provided during vehicle operation for cooling for vehicles with side and re-mounted engines.

Therefore, it is desired to provide a torque transmission system that allows selective control of an output device (e.g., fan) at an angle (e.g., 90°) relative to a torque output from a prime mover, such as an internal combustion engine.

SUMMARY

In one aspect of the present invention, a torque transmission system for transmitting torque from a prime mover along a drivetrain includes a clutch device configured to accept a torque input from the prime mover, an intermediate pulley, a belt operatively engaged between the clutch device and the intermediate pulley, an angle gearbox configured to change a spatial orientation of torque transmitted between an input and an output of the angle gearbox, a driveshaft operably engaged between the intermediate pulley and the angle gearbox, and an output device configured to accept a torque output from the angle gearbox. The clutch device is located upstream from the intermediate pulley and the angle gearbox along the drivetrain.

The present summary is provided only by way of example, and not limitation. Other aspects of the present invention will be appreciated in view of the entirety of the present disclosure, including the entire text, claims and accompanying figures. For instance, another aspect of the present invention includes a method.

While the above-identified figures set forth embodiments of the present invention, other embodiments are also contemplated, as noted in the discussion. In all cases, this disclosure presents the invention by way of representation and not limitation. It should be understood that numerous other modifications and embodiments can be devised by those skilled in the art, which fall within the scope and spirit of the principles of the invention. The figures may not be drawn to scale, and applications and embodiments of the present invention may include features, steps and/or components not specifically shown in the drawings.

DETAILED DESCRIPTION

In general, the present invention provides a torque transmission and clutch system suitable for selectably driving an output device (e.g., fan), for instance in automotive (e.g., bus, recreational vehicle, truck, etc.), vocational and industrial applications, where the output device is arranged at an angle (e.g., 90°) relative to a torque output from a prime mover (e.g., a vehicle engine). A clutch, such as a viscous clutch, can be included in the clutch system to regulate torque transmission from the prime mover to other components of the system. The clutch can have a belt input and belt output in one embodiment, though in other embodiments drive chains, shafts or other mechanisms can be used. One or more tensioners can be provided as desired for belt tensioning. A gearbox with a right-angle output can be interposed between the clutch and the output device, such that the clutch regulates input torque transmission through the gearbox and any intermediate belts, pulleys (also called sheaves), driveshafts, and the like. In some embodiments the clutch can be controlled electronically, and can enable fully variable speed control for all components of the system, leading to reduction in parasitic loading on the prime mover (e.g., an internal combustion engine). Upstream positioning of the clutch within a drivetrain of the system provides performance benefits for reducing undesirable rotation of system components. This promotes noise reduction and reduced drivetrain component wear. Moreover, the system allows for flexible packaging and a relatively compact overall size, allowing for use in a variety of applications. A number of other features and benefits of the present invention will be appreciated in view of the entirety of the present disclosure, including the accompanying figures.

This application claims priority to U.S. provisional patent application Ser. No. 62/163,659, filed May 19, 2016, which is hereby incorporated by reference in its entirety.

Figure 1:
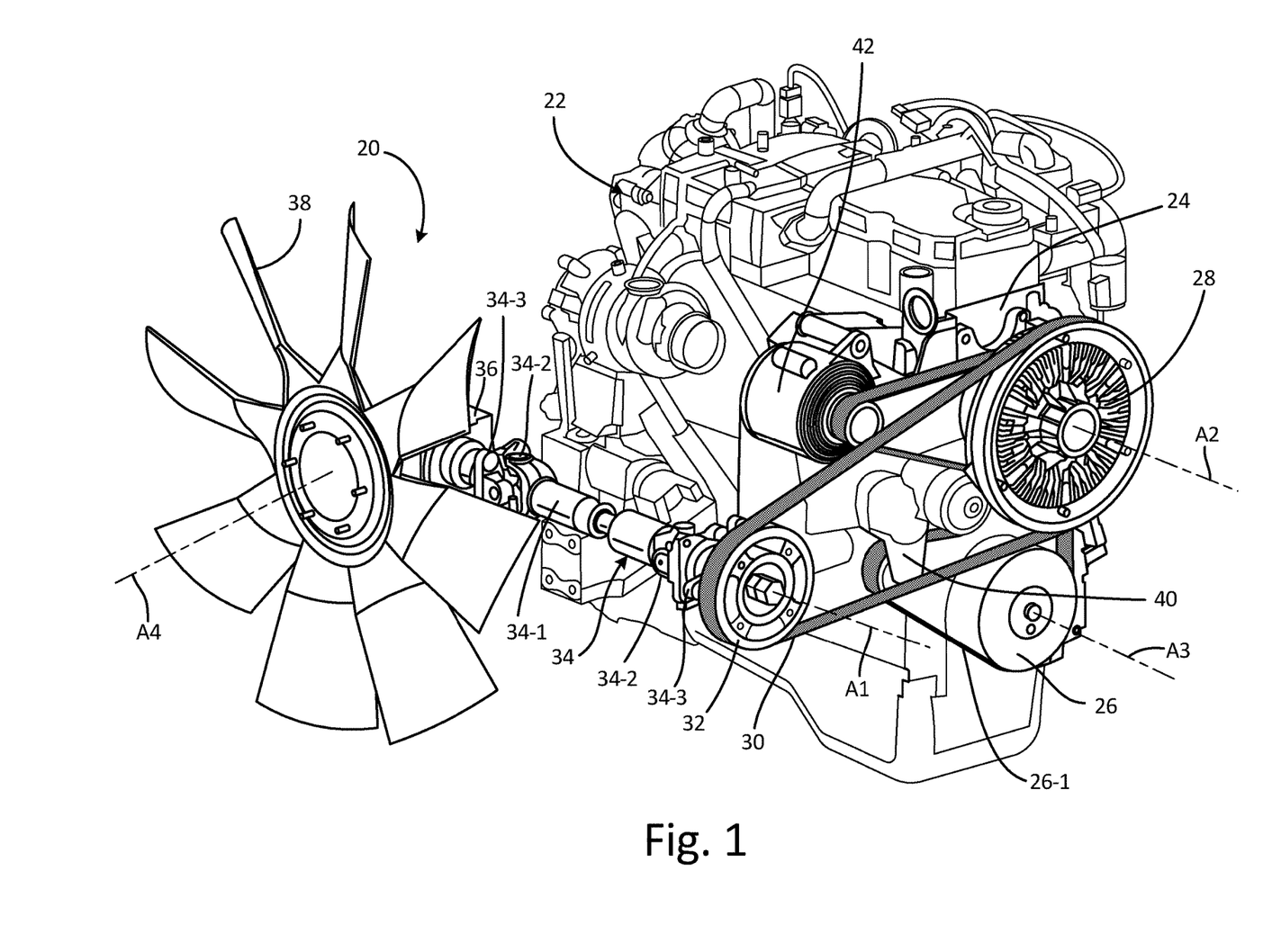
FIG. 1 is a perspective view of an embodiment of a clutch system of the present invention, shown with an internal combustion engine.

FIG. 1 is a perspective view of an embodiment of a clutch system 20, shown with an internal combustion engine 22. Although FIG. 1 illustrates the internal combustion engine 22 (e.g., a diesel engine) as a prime mover that provides a torque input to the clutch system 20, in further embodiments other types of prime movers can be utilized.

In the illustrated embodiment, the engine 22 includes a block 24 and an output member 26 that provides a torque output. The block 24 can provide a mounting point for portions of the clutch system 20. The output member 26 typically protrudes from the engine 22, and can engage a belt 26-1. A rotational speed of the output member 26 can vary during operation, depending on a throttle command to the engine 22, which consequently varies the speed input to the clutch system 20.

The clutch system 20 provides a drivetrain that includes a clutch device 28, belt 30, intermediate pulley 32, driveshaft 34, and angle gearbox 36. The drivetrain of the clutch system 20 engages an output member 38 at a furthest downstream end. The clutch device 28 accepts torque input from the engine 22 via the belt 26-1, and selectively transmits torque to the intermediate pulley 32 via the belt 30. The intermediate pulley transmits torque to the driveshaft 34, which in turn transmits torque to the angle gearbox 36. The output member 38, which is a fan in the illustrated embodiment, is rotated by a torque output from the angle gearbox 36. When the output member 38 is a fan, the fan can be positioned to direct cooling flows at the engine 22, or move cooling flows through a heat exchanger (not shown), among other possible functions.

In the illustrated embodiment, the clutch device 28 is mounted directly to the block 24 of the engine 22, adjacent to or nearby the output member 26. The belt 26-1 couples to the output member 26 and the clutch device 28. Also coupled to the belt 26-1 in the illustrated embodiment are a tensioner 40 and an accessory 42 (e.g., generator, air conditioner compressor, etc.). It should be noted that the particular arrangement of the belt 26-1 and the particular set of devices commonly coupled to the belt 26-1 can vary as desired for particular applications. For instance, an idler and other components can also be engaged with the belt 26-1.

As shown in FIG. 1, the intermediate pulley 32 is arranged with an axis of rotation A1 that is parallel (that is, at the same angle) as an axis of rotation A2 of the clutch device 28 (and the axis of rotation A3 of the output member 26), but is offset at a distance from the axis A2 of the clutch device 28. The intermediate pulley is further spaced from the engine 22. The belt 30 is coupled between the clutch device 28 and the intermediate pulley 32. A rotational speed of the intermediate pulley 32 can be controlled through selective control of an output speed of the clutch device 28. Pulley sizing can be selected to achieve a desired speed ratio between the intermediate pulley 32 and an output of the clutch device 28.

The driveshaft is coupled between the intermediate pulley 32 and the angle gearbox 36. The driveshaft 34 in the illustrated embodiment includes an adjustable length main shaft 34-1, universal joints 34-2, and support bearings 34-3. Use of the adjustable length main shaft 34-1 and the universal joints 34-2 allows the system 20 to be adapted to a variety of applications, and allows for an offset between the intermediate pulley 32 and the angle gearbox 36 (i.e., the axis of rotation A1 of the intermediate pulley 32 can be offset from an axis of a rotational input to the angle gearbox 36; not shown in FIG. 1). The universal joints 34-2 and the support bearings 34-3, among other components of the system 20, contribute drag and inertia to the system 20, which are generally considered losses but the present inventors have discovered that those properties have certain advantages in the particular context of the system 20, as discussed further below.

Generally, the angle gearbox 36 changes a spatial orientation of torque transmitted between an input and an output, using bevel gears or other suitable mechanisms. In the illustrated embodiment the angle gearbox 36 is a right-angle gearbox that changes the spatial orientation of the transmitted torque by 90°, although in alternative embodiments other angles are possible. The angle gearbox 36 can provide a 1:1 gear ratio (i.e., without increasing or decreasing output speed relative to input speed), or other gear ratios in alternative embodiments, as desired for particular applications. An output of the angle gearbox 36 is operatively connected to the output device 38 (e.g., fan), such as through a hub or output shaft, in order to drive the output device 38 about an axis of rotation A4. The rotational speed of the output device 38 is governed by the clutch device 28. In this way, the output device 38 and the output of the angle gearbox 26, and the rotational axis A4, can be spatially oriented at a different angle than the axes A2 and A3 of the clutch device 28 and/or the output member 26 of the engine 22, as well as at a different angle than the axis of rotation A1 of the intermediate pulley 32.

The clutch device 28 can be positioned at an upstream or driven end of the system 20, with a direct physical mounting engagement to the engine 22, and with a single belt (the belt 26-1) providing a torque linkage between the engine 22 and the clutch device 28. This places the clutch device 28 at the most upstream position of the drivetrain of the clutch system 20. In this way, torque output from the engine 22 is selectively controlled by the clutch device 28 at the input to the clutch system 20. In contrast, prior art systems include a clutching mechanism at a downstream or driving end, incorporated into an angle gearbox or mounted directly to a fan (i.e., output member). The configuration of the present invention permits the clutch device 28 to govern operation of essentially all of the components of the system 20, and allows torque to the other components of the system 20 to be selectively turned off. For instance, torque input to the angle gearbox 36 (located downstream from the clutch device 28 in the drivetrain of the system 20) can be controlled by the clutch device 28 independent of output of the engine 22. Moreover, the drag and inertia of the universal joints 34-2 and the support bearings 34-3 of the driveshaft 34, meshed gears of the angle gearbox 36, and/or the intermediate pulley 32, among other possible components of the drivetrain, all limit rotation of an output of the clutch device 28, therefore providing an increased tendency for output speed of the clutch device 28 to approach zero. The drag and inertia of downstream portions of the drivetrain of the clutch system 20 can help provide a fully "off" state of the clutch device 28, such that when turned "off" the output of the clutch device 28 is effectively stopped from rotating, and components of the system 20 beyond/downstream of the clutch device 28 can all be essentially stationary (i.e., unpowered, though some fan windmilling of the output device 38 may occur in some instances). In contrast, numerous upstream drivetrain components (if not most components of the drivetrain) run all the time (i.e., whenever the engine is running) in prior art systems.

It should be noted that the illustrated embodiment of the system 20 shown in FIG. 1 is provided merely by way of example and not limitation. For instance, additional intermediate pulleys and belts can be provided in further embodiments, and/or relative spacing between components of the system can be adjusted, to suit particular applications.

Figure 2:
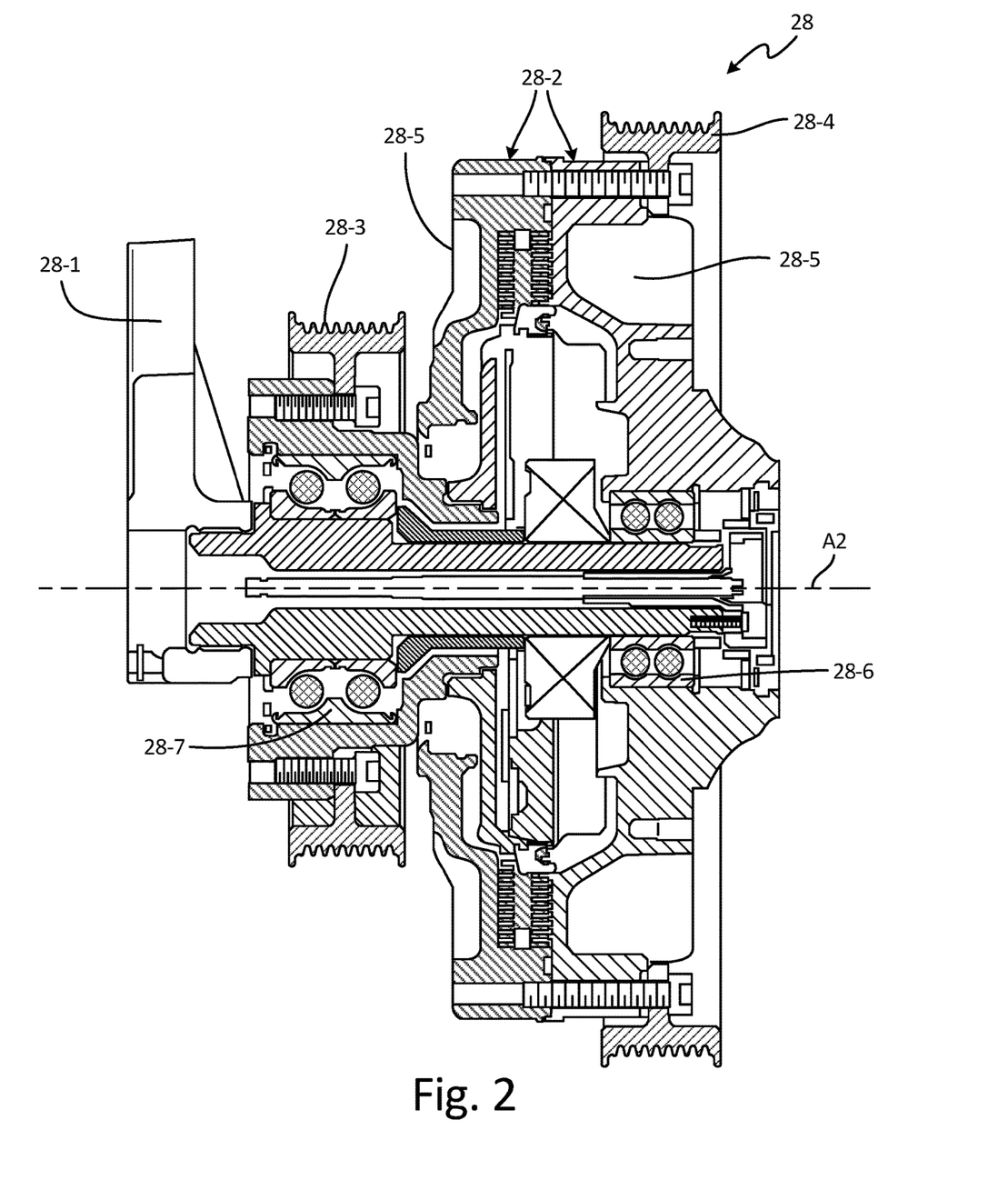
FIG. 2 is a cross-sectional view of an embodiment of a clutch device of the clutch system.

FIG. 2 is a cross-sectional view of an embodiment of the clutch device 28, shown in isolation. In the illustrated embodiment, the clutch device 28 includes a bracket (with a stationary mounting shaft) 28-1, a clutch (or clutch pack) 28-2, and pulleys 28-3 and 28-4. The clutch 28-2 provides selective transmission of torque between an input and output. The clutch 28-2 can be a viscous clutch, such as a viscous clutch configured in a manner similar to that disclosed in U.S. Pat. No. 8,887,888. Such a viscous clutch configuration allows fully variable slip speed, that is, with a clutch output speed controllable to any desired set points between essentially 0-100% of clutch input speed by controlling a volume of a shear fluid present in a working chamber between input and output structures (e.g., between a rotor and a housing, which can be a two-piece housing with a base and cover). The clutch device 28 can be controlled electronically, using suitable controls (not shown). In alternative embodiments, a live-shaft viscous clutch, a friction clutch, and eddy current clutch, or other suitable clutch can be utilized.

The pulleys 28-3 and 28-4 are engaged with the clutch 28-2. The pulley 28-3 can function as an input member for the clutch 28-2, and be engaged with the belt 26-1 that provides a torque input. The pulley 28-4 can function as an output member for the clutch 28-2, and be engaged with the belt 30 that transmits a torque output (to the intermediate pulley 32). In the illustrated embodiment, the pulleys 28-3 and 28-4 are arranged parallel to each other, and, more specifically, arranged coaxially, with a common axis of rotation (axis A2).

The clutch 28-2 can include external fins 28-5 that generate cooling airflows during operation, to help dissipate heat generated by the clutch 28-2. Because the clutch device 28 is located away from the fan serving as the output device 38, and is potentially not exposed to significant ram air flows, the ability to actively dissipate heat is beneficial. The fins 28-5 help maintain a relatively evenly distributed heat load on the clutch device 28.

Additionally, the clutch 28-2 can include a support bearing set 28-6 at or near a distal end of the stationary mounting shaft of the bracket 28-1 and aligned with the pulley 28-4, in order to help support a belt load from the belt 30. Similarly, a support bearing set 28-7 can be included at or near a proximal end of the stationary mounting shaft of the bracket 28-1 and aligned with the pulley 28-3, in order to help support a belt load from the belt 26-1.

The stationary mounting shaft can be integrally and monolithically formed with other portions of the bracket 28-1, or can be a discrete component attached to one or more other pieces to form the bracket 28-1.

Figure 3:
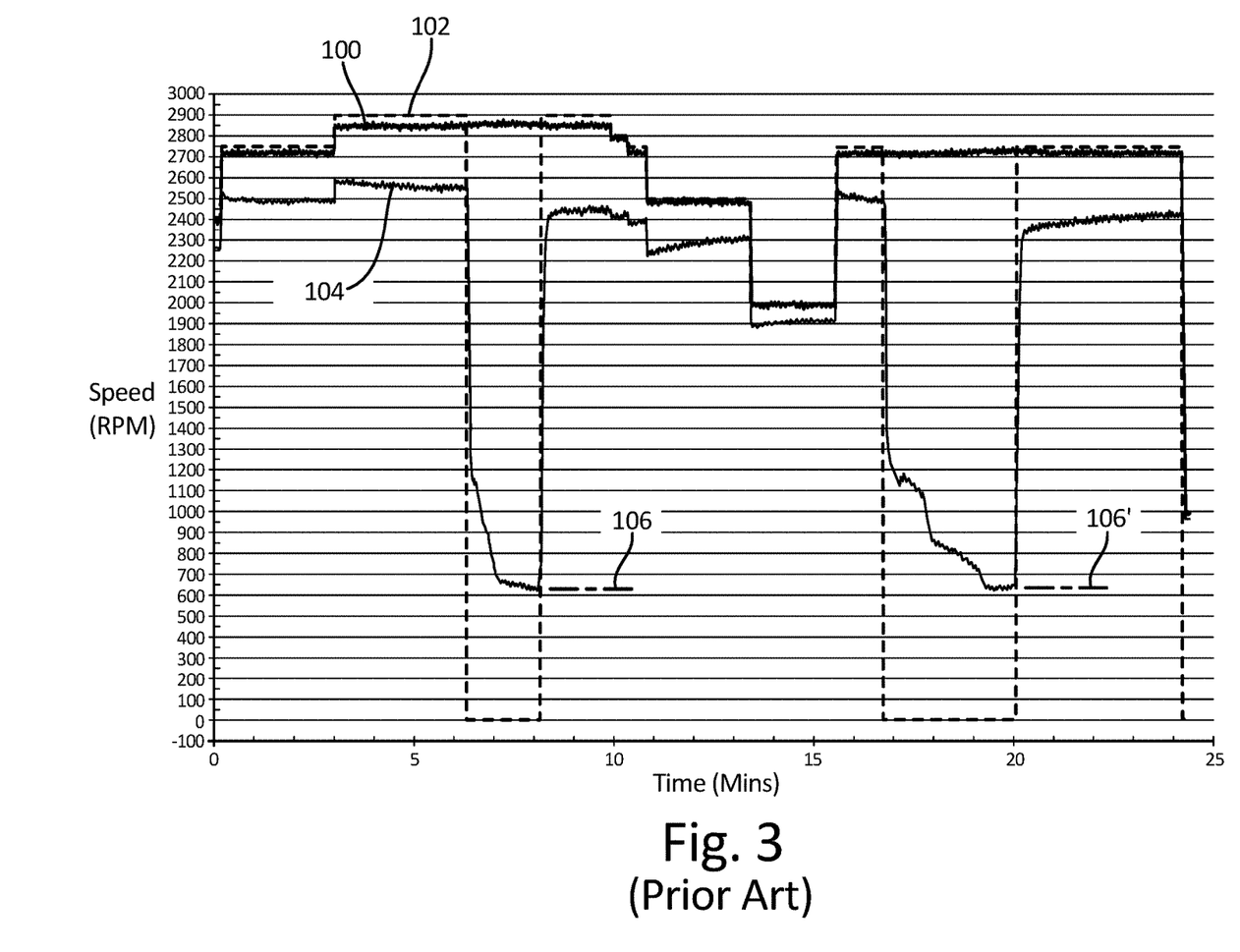
FIG. 3 is a graph of speed vs. time for a prior art clutch system.
Figure 4:
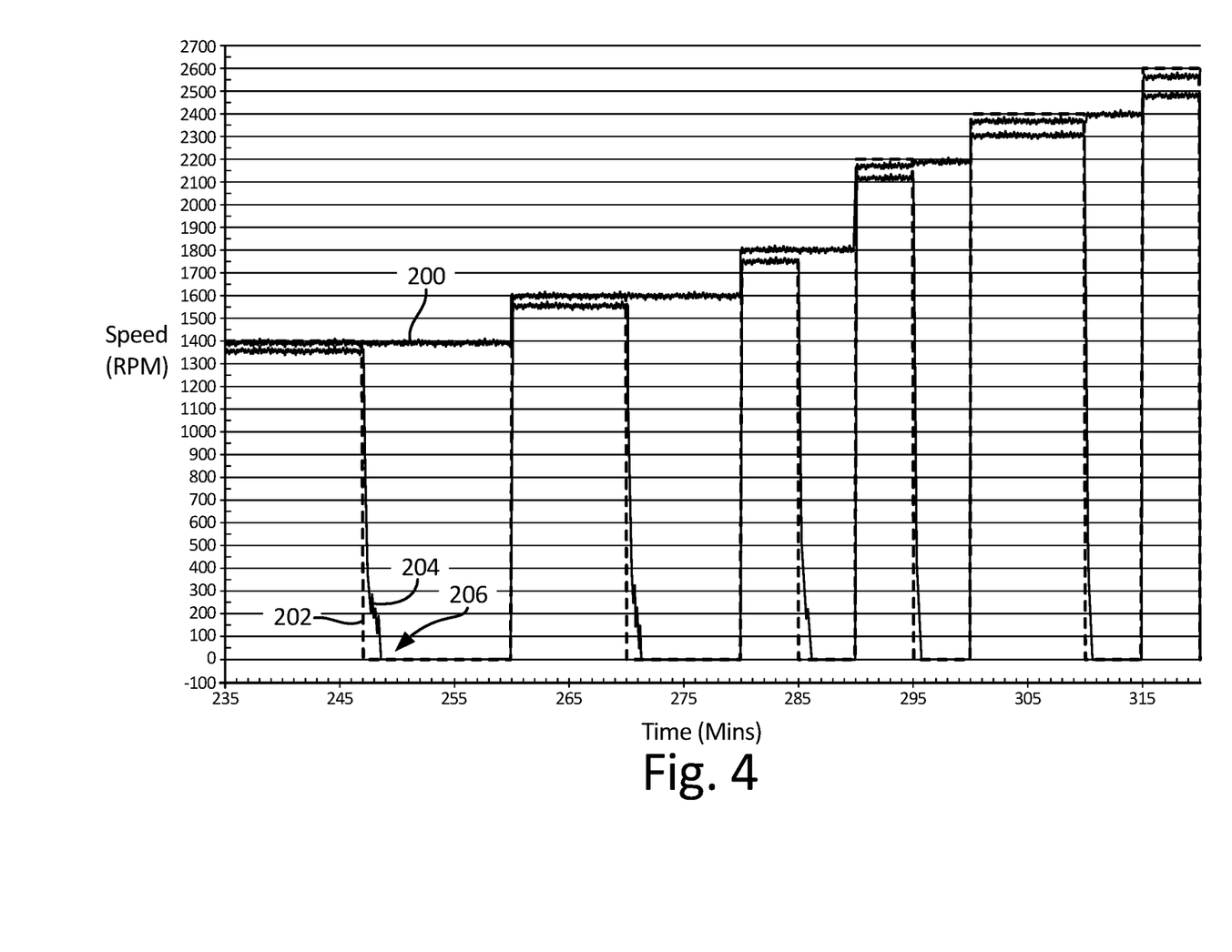
FIG. 4 is a graph of speed vs. time for a prototype of the clutch system of the present invention.

FIGS. 3 and 4 are graphs that illustrate certain performance characteristics and benefits in relation to the prior art, based on testing performed in a test cell. FIG. 3 is a graph of speed vs. time for a prior art clutch system, and FIG. 4 is a graph of speed vs. time for a prototype of the clutch system 20.

In the prior art system graphed in FIG. 3, a direct-sensing, electronically-controlled viscous clutch was directly mounted on a right-angle gearbox, and a fan was directly mounted on the direct-sensing viscous clutch as an output device. In other words, the viscous clutch was positioned at the downstream end of the drivetrain, directly adjacent to the fan. The graph of FIG. 3 plots an input speed (i.e., of a torque input from a prime mover) as line 100, a clutch speed command as line 102, and a fan speed as line 104. With any system using a viscous clutch, the fan speed (line 104) will never reach 100% of the input speed (line 100), but, generally, the fan speed (line 104) adjusts to the speed command (line 102) as bounded by the input speed (line 100). However, there are system lags, and the fan speed (line 104) encounters a lower limit significantly greater than zero. For instance, FIG. 3 illustrates two time periods during which the speed command (line 102) goes to zero, indicating that the fan clutch is turned "off," while the input speed (line 100) remains non-zero, during which times the fan speed (line 104) drops to lower limits 106 and 106' at approximately 650 RPM. Furthermore, a lag time of approximately 1 to 3 minutes occurs between the speed command (line 102) dropping to zero and the fan speed (line 104) dropping to the lower limits 106 and 106'.

A prototype of the system 20 was utilized to generate the graph of FIG. 4, which plots an input speed (i.e., of a torque input from a prime mover) as line 200, a clutch speed command as line 202, and a fan speed as line 204. FIG. 4 illustrates multiple time periods during which the speed command (line 202) goes to zero, indicating that the fan clutch is turned "off," while the input speed (line 200) remains non-zero, during which times the fan speed (line 204) drops to lower limit 206 at approximately 0 RPM. Furthermore, a lag time of approximately 1 to 1.5 minutes occurs between the speed command (line 202) dropping to zero and the fan speed (line 204) dropping to the lower limit 206.

Comparing FIGS. 3 and 4, it can be seen that the lower limit 206 for the system 20 is substantially lower than the lower limits 106 and 106' of the prior art system. Moreover, the lag times of the system 20 are the same or lower than for the prior art system. This represents significant improvement in "off" response times for the system 20, which are attributable, at least in part, to the upstream position of the clutch device 28 in the system 20 and the parameters such as drag and inertia of downstream drivetrain components of the system 20.

There are multiple benefits to shutting down the entire drivetrain (past the clutch device). These benefits include the availability of nearly zero output device (e.g., fan) speed, which is favorable for cold weather applications, helps reduce noise, and helps reduce drivetrain component wear. Parasitic losses are minimized, in the sense that parasitic losses to engine power downstream on the drivetrain of the system 20 can go to zero when the clutch device 28 is "off" (that is, set to a zero torque output), while drag and inertia that would otherwise act as a parasitic loss provide a beneficial effect on holding the output of the clutch device 28 and the output device 38 at (or near) a rotational speed of zero—and more specifically at a lower "off" speed than prior art systems.

Persons of ordinary skill in the art will appreciate numerous other advantages and benefits of the present invention in view of the entire disclosure, including the accompanying figures.

DISCUSSION OF POSSIBLE EMBODIMENTS

The following are non-exclusive descriptions of possible embodiments of the present invention.

A torque transmission system for transmitting torque from a prime mover along a drivetrain includes a clutch device configured to accept a torque input from the prime mover; an intermediate pulley; a belt operatively engaged between the clutch device and the intermediate pulley; an angle gearbox configured to change a spatial orientation of torque transmitted between an input and an output of the angle gearbox; a driveshaft operably engaged between the intermediate pulley and the angle gearbox; and an output device configured to accept a torque output from the angle gearbox. The clutch device is located upstream from the intermediate pulley and the angle gearbox along the drivetrain.

The system of the preceding paragraph can optionally include, additionally and/or alternatively, any one or more of the following features, configurations and/or additional components:

the clutch device can comprise a viscous clutch;

the clutch device can include: an input pulley to accept a torque input from the prime mover; and an output pulley to transmit torque to the belt operatively engaged between the clutch device and the intermediate pulley;

the input pulley and the output pulley can be arranged coaxially;

the angle gearbox can be a right-angle gearbox;

the clutch device can be located at a furthest upstream end of the drivetrain of the torque transmission system;

the driveshaft can include a universal joint;

a support bearing located downstream of the clutch device in the drivetrain; and/or the output device can be a fan.

A method for transmitting torque from a prime mover to an output device along a drivetrain can include: selectively engaging a clutch device to selectively transmit torque from the prime mover to a belt; rotating an intermediate pulley with the belt; rotating a driveshaft with torque from the intermediate pulley; redirecting torque from the driveshaft to a different spatial orientation via an angle gearbox; and rotating the output device with a torque output from the angle gearbox.

The method of the preceding paragraph can optionally include, additionally and/or alternatively, any one or more of the following steps, features, and/or configurations:

limiting rotation of the output device using a property of a drivetrain component, wherein the property of the drivetrain component is selected from the group consisting of drag and inertia;

torque from the driveshaft can be redirected 90°; and/or rotating an additional belt to provide torque from the prime mover to the clutch device.

A cooling system includes: an internal combustion engine; a first belt configured to transmit torque from the internal combustion engine; a drivetrain, and a fan. The drivetrain includes: a clutch device configured to accept a torque input from the first belt; an intermediate pulley; a second belt operatively engaged between the clutch device and the intermediate pulley; an angle gearbox configured to change a spatial orientation of torque transmitted between an input and an output of the angle gearbox; and a driveshaft operably engaged between the intermediate pulley and the angle gearbox. The clutch device is located upstream from the intermediate pulley and the angle gearbox along the drivetrain. The fan is configured to accept a torque output from the drivetrain.

The system of the preceding paragraph can optionally include, additionally and/or alternatively, any one or more of the following features, configurations and/or additional components:

the clutch device can comprise a viscous clutch;

the clutch device can include: an input pulley to accept a torque input from the first belt; and an output pulley to transmit torque to the second belt;

the input pulley and the output pulley can be arranged coaxially;

the angle gearbox can be a right-angle gearbox;

the clutch device can be located at a furthest upstream end of the drivetrain of the torque transmission system;

the driveshaft can include a universal joint; and/or a support bearing located downstream of the clutch device.

Summation

Any relative terms or terms of degree used herein, such as "substantially", "essentially", "generally", "approximately" and the like, should be interpreted in accordance with and subject to any applicable definitions or limits expressly stated herein. In all instances, any relative terms or terms of degree used herein should be interpreted to broadly encompass any relevant disclosed embodiments as well as such ranges or variations as would be understood by a person of ordinary skill in the art in view of the entirety of the present disclosure, such as to encompass ordinary manufacturing tolerance variations, incidental alignment variations, transient alignment or shape variations induced by thermal, rotational or vibrational operational conditions, and the like. Moreover, any relative terms or terms of degree used herein should be interpreted to encompass a range that expressly includes the designated quality, characteristic, parameter or value, without variation, as if no qualifying relative term or term of degree were utilized in the given disclosure or recitation.

Although the present invention has been described with reference to preferred embodiments, workers skilled in the art will recognize that changes may be made in form and detail without departing from the spirit and scope of the invention.

The invention claimed is:

1. A torque transmission system for transmitting torque from a prime mover along a drivetrain, the system comprising:

a clutch device configured to accept a torque input from the prime mover;

an intermediate pulley;

a belt operatively engaged between the clutch device and the intermediate pulley;

an angle gearbox configured to change a spatial orientation of torque transmitted between an input and an output of the angle gearbox;

a driveshaft operably engaged between the intermediate pulley and the angle gearbox; and an output device configured to accept a torque output from the angle gearbox, wherein the clutch device is located upstream from the intermediate pulley and the angle gearbox along the drivetrain.

2. The system of claim 1, wherein the clutch device comprises a viscous clutch.

3. The system of claim 1, wherein the clutch device comprises:

an input pulley to accept a torque input from the prime mover; and an output pulley to transmit torque to the belt operatively engaged between the clutch device and the intermediate pulley.

4. The system of claim 3, wherein the input pulley and the output pulley are arranged coaxially.

5. The system of claim 1, wherein the angle gearbox is a right-angle gearbox.

6. The system of claim 1, wherein the clutch device is located at a furthest upstream end of the drivetrain of the torque transmission system.

7. The system of claim 1, wherein the driveshaft comprises:

a universal joint.

8. The system of claim 1 and further comprising:

a support bearing located downstream of the clutch device in the drivetrain.

9. The system of claim 1, wherein the output device is a fan.

10. A method for transmitting torque from a prime mover to an output device along a drivetrain, the method comprising:

selectively engaging a clutch device to selectively transmit torque from the prime mover to a belt;

rotating an intermediate pulley with the belt;

rotating a driveshaft with torque from the intermediate pulley;

redirecting torque from the driveshaft to a different spatial orientation via an angle gearbox; and rotating the output device with a torque output from the angle gearbox.

11. The method of claim 10 and further comprising:
limiting rotation of the output device using a property of a drivetrain component, wherein the property of the drivetrain component is selected from the group consisting of drag and inertia.

12. The method of claim 10, wherein torque from the driveshaft is redirected 90°.

13. The method of claim 10 and further comprising:
rotating an additional belt to provide torque from the prime mover to the clutch device.

14. A cooling system comprising:
an internal combustion engine;
a first belt configured to transmit torque from the internal combustion engine;
a drivetrain, the drivetrain comprising:
   a clutch device configured to accept a torque input from the first belt;
   an intermediate pulley;
   a second belt operatively engaged between the clutch device and the intermediate pulley;
   an angle gearbox configured to change a spatial orientation of torque transmitted between an input and an output of the angle gearbox; and
   a driveshaft operably engaged between the intermediate pulley and the angle gearbox,
   wherein the clutch device is located upstream from the intermediate pulley and the angle gearbox along the drivetrain; and
a fan configured to accept a torque output from the drivetrain.

15. The system of claim 14, wherein the clutch device comprises a viscous clutch.

16. The system of claim 14, wherein the clutch device comprises:
an input pulley to accept a torque input from the first belt; and
an output pulley to transmit torque to the second belt.

17. The system of claim 16, wherein the input pulley and the output pulley are arranged coaxially.

18. The system of claim 14, wherein the angle gearbox is a right-angle gearbox.

19. The system of claim 14, wherein the clutch device is located at a furthest upstream end of the drivetrain of the cooling system.

20. The system of claim 14, wherein the drivetrain further comprises:
a universal joint along the driveshaft; and
a support bearing located downstream of the clutch device.

* * * * *